US010481920B2

(12) United States Patent
Schmoetzer

(10) Patent No.: US 10,481,920 B2
(45) Date of Patent: Nov. 19, 2019

(54) METHOD OF EXTENDING THE DEVICE DESCRIPTION FILE OF FIELD DEVICES AND FIELD DEVICE HAVING AN EXTENSIBLE DEVICE DESCRIPTION FILE

(71) Applicant: BUERKERT WERKE GMBH, Ingelfingen (DE)

(72) Inventor: Ralf Schmoetzer, Hohebach (DE)

(73) Assignee: BUERKERT WERKE GMBH (DE)

( * ) Notice: Subject to any disclaimer, the term of this patent is extended or adjusted under 35 U.S.C. 154(b) by 121 days.

(21) Appl. No.: 15/336,860

(22) Filed: Oct. 28, 2016

(65) Prior Publication Data

US 2017/0123827 A1 May 4, 2017

(30) Foreign Application Priority Data

Oct. 30, 2015 (EP) .................................... 15192335

(51) Int. Cl.
*G06F 15/177* (2006.01)
*G06F 9/00* (2006.01)
*G06F 9/24* (2006.01)
*G06F 9/445* (2018.01)
*G05B 19/042* (2006.01)

(52) U.S. Cl.
CPC ..... *G06F 9/44505* (2013.01); *G05B 19/0426* (2013.01)

(58) Field of Classification Search
CPC .................................................. G06F 9/44505
See application file for complete search history.

(56) References Cited

U.S. PATENT DOCUMENTS

| 8,000,815 B2 | 8/2011 | John et al. |
| 2011/0125295 A1 | 5/2011 | Bednasch |
| 2012/0143586 A1 | 6/2012 | Vetter |
| 2016/0188322 A1 | 6/2016 | DeGroot |

FOREIGN PATENT DOCUMENTS

| DE | 102007062398 A1 | 6/2009 |
| DE | 102008010484 A1 | 8/2009 |

OTHER PUBLICATIONS

"CANopen", Feb. 24, 2013, Wikipedia, pp. 1-8 (Year: 2013).*
Jochen Muller et al: "Optimisation of Field Device Life-cycle in Process Automation by a Flexible Component-based Function Management," Industrial Informatics, 2006 IEEE, International Conference ON, IEEE, PI, 1. Aug. 2006, Seiten 120-125, XP03100337, ISBN: 978-0-7803-9700-2.

* cited by examiner

*Primary Examiner* — Xuxing Chen
(74) *Attorney, Agent, or Firm* — Carlson, Gaskey & Olds P.C.

(57) ABSTRACT

A method and system of the subject invention provides for the extension of a device description file of a field device. The device description file is loaded on a field device, the field device is put into operation with the device description file in a fieldbus system, and an extension file is loaded on the field device during the operation of the field device. The extension file contains only concrete objects.

20 Claims, 2 Drawing Sheets

METHOD OF EXTENDING THE DEVICE DESCRIPTION FILE OF FIELD DEVICES AND FIELD DEVICE HAVING AN EXTENSIBLE DEVICE DESCRIPTION FILE

CROSS-REFERENCE TO RELATED APPLICATIONS

This application claims priority to European Application 15 192 335.6, filed Oct. 30, 2015.

FIELD OF THE INVENTION

The present invention relates to fieldbus systems, field devices and methods for fieldbus systems and field devices.

BACKGROUND

Functions and properties of CANopen devices (field devices), for example, are largely described using objects and are managed in an object dictionary. The object dictionary is represented in an electronic form in so-called EDS files (Electronic Data Sheet). EDS files are an inherent part of standardization in the CANopen environment (CiA DS306 and CiA DS311) and have a fundamental importance when the configuration in CANopen networks is involved. The file format specified by CiA ensures that the device descriptions of tools (for example ProCANopen) of different software companies can be read and processed. An EDS file (electronic data sheet) is therefore an example for a device description file which is permanently stored as firmware on a field device and contains all information concerning the device-specific parameters and operating modes of the device. Using the device description file, the device is properly configured or put into operation.

It is basically possible to make a distinction between field devices having a permanent configuration and field devices having an adjustable configuration. In a field device having a permanent configuration, it is clearly defined which process data (for example digital inputs or current speeds) are transmitted at what time and by which fieldbus (for example CAN) message. These settings cannot be modified later. Devices having a permanent configuration are often less expensive to purchase than devices of identical design which permit a configuration of the device during operation. The reasons therefore are the considerably simpler software structures and the transparent device implementation resulting therefrom. Field devices having an adjustable configuration have to be configured before being put into operation. All device parameters are defined using an appropriate configuration tool (ProCANopen, for example). The configuration thus obtained is then stored in the device. In a field device having an adjustable configuration, the network configuration created using the configuration tool is also stored in the field device provided that the devices support the "nonvolatile" storage (configuration data are not lost at a restart) of the configuration data. Alternatively, the device configuration can be stored in a configuration manager which performs the configuration of the configurable devices at a system startup. The configuration manager has to be defined already within the context of the network configuration. This approach permits the simple replacement of a defective device with a new device of identical design (simple maintenance of the system).

The disadvantage of the known device description files consists in that field devices can only be used in a known system. The use in a new or modified system requires an adjustment of the device description file and thus a replacement of the firmware of the field device.

To permit a higher flexibility at running time, it is known to use so-called "dummy objects". These objects however constantly occupy resources which are not needed. Furthermore, dummy objects permit merely a limited flexibility and are confusing for the user.

SUMMARY

According to one aspect, a method of extending a device description file of a field device is provided.

A device description file is accordingly loaded on the field device. The field device with the device description file is put into operation in a fieldbus system. An extension file is then loaded on the field device, more specifically during operation of the field device. The extension file merely contains concrete objects.

According to the standard, a concrete object can be defined by the following specifications: a parameter name (ParameterName; necessary); an object type (ObjectType (VAR); optional); a data type (DataType; necessary); an access Type (AccessType; necessary); a default value (DefaultValue; optional); the PDOMapping (optional); the SubNumber (optional); a lower limit (LowLimit; optional); an upper limit (HighLimit; optional); a flag (OjbFlags; optional), and the value CompactSubOjb (optional). From this follows that the minimum specification for a concrete object according to the standard is composed of the specification of a parameter name, a data type and an access type.

The invention also provides a system, which comprise a fieldbus system having at least one field device, the system being configured to load a device description file on the field device, to put the field device into operation with the device description file in the fieldbus system, and to load an extension file on the field device during operation of the field device, wherein the extension file only includes concrete objects.

The device description file and the extension file advantageously use the same syntax. Advantageously, the device description file is an EDS (Electronic Data Sheet) device description file for the CANopen standard, the extension file is an EDS extension for the CANopen standard, and the field device is configured for a fieldbus system according to the CANopen standard.

The first standard may be a CANopen standard as described at the beginning and described for example in the CiA 306 Draft Standard Proposal, version: 1.3.7 of Mar. 18, 2014. Further norms which are used for the standard are:

/CiA301/CiA 301, CANopen application layer and communication profile

/CiA302/CiA 302-4, CANopen Additional application layer functions

Part 4: Network variables and process image

/CiA305/CiA 305, CANopen layer setting services (LSS) and protocols

/CiA401/CiA 401, CANopen device profile generic I/O modules

/ISO646/ISO/IEC 646, ISO 7-bit coded character set for information interchange

In the case of the CANopen standard, the EDS device description file is thus at first loaded on the field device. The field device may be put into operation via the EDS device description file. In a further step, an EDS extension file is loaded on the field device. This occurs during operation of the field device. The EDS device description file and the EDS extension file use the same syntax. The EDS device description extension file comprises concrete objects by which the list of objects of the EDS device description file is extended.

The EDS device description extension file, i.e. the list of additional objects, is then advantageously parsed. After a restart, the EDS device description file and the EDS device description extension file can be used, as a result of which the additional concrete objects are made available Here, it is dispensed with the realization of complete additional functions for field devices. According to the invention, it is taken advantage of the fact that an EDS file describes a device via concrete communicating objects. Using the EDS extension (EDS device description extension file), the object dictionary of a device is dynamically extended by concrete objects at runtime. The EDS extension thus advantageously comprises merely concrete objects (variables). These concrete objects can then be used by functions of the device. The execution of the functions or the function association takes place in the device itself. It is thus, for example, possible that a device includes a sensor which is adapted to measure and evaluate several values. The EDS device description file may then be configured such that it only defines a process value so that a client can purchase this device, for example, as a flowmeter and can thus only measure and process the flow. The manner how the device processes the information as to the flow, i.e. the function, is inherent in the device or is realized at a different place. According to the invention, a further concrete object, for example the pH value, can then be associated with this device at runtime using the EDS extension file, so that it is now possible to measure the flow and the pH value using this device. According to the invention, the function "processing the pH value" is also implemented in the device at the manufacturing site, or is implemented at a different place in the device networks (for example by using an own document).

In the present context, a concrete object is characterized by concrete data types and concrete object names.

In contrast to known methods, the invention thus permits to work with concrete data types and concrete object names. The field device makes the EDS file containing both static objects and dynamic objects added at runtime by the method available to the system. Furthermore, there is no definition of a maximum construction stage. In other words, the field device shows itself to a control only with the concrete objects.

BRIEF DESCRIPTION OF THE DRAWINGS

Further aspects and features of the invention will become apparent from the description below of example embodiments with reference to the accompanying drawings in which.

DETAILED DESCRIPTION

Figure 1:
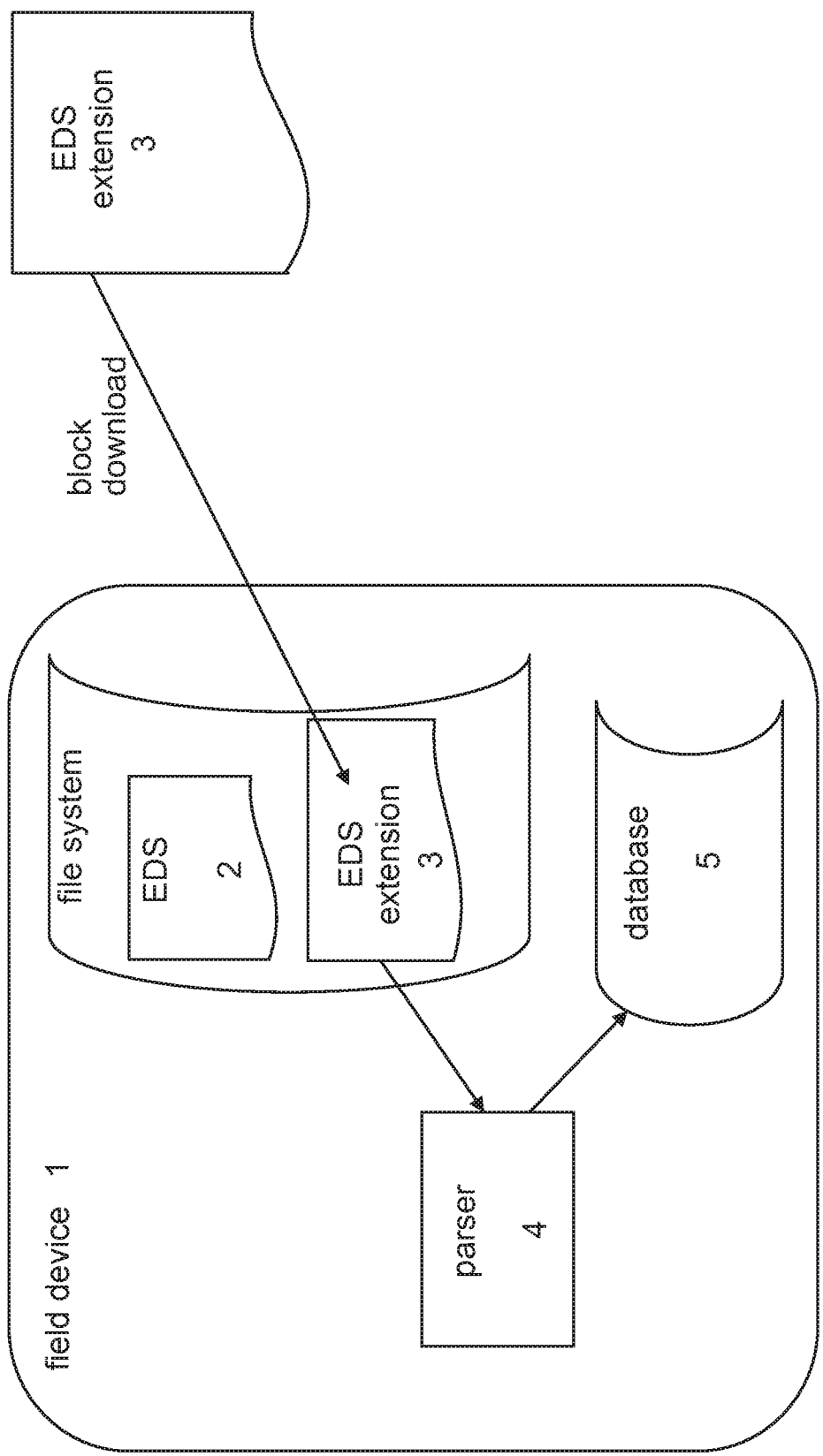
FIG. 1 is a simplified block representation of the invention.

FIG. 1 is a simplified block representation of the invention. A field device 1 is represented. Field device 1 is a device which is involved in a fieldbus system according to the CANopen standard and which works in accordance with this standard. The field device thus includes an EDS device description file 2 with which it can be put into operation. The field device 1 may, for example, be a gateway or a controller.

It is then possible to load an EDS extension 3 on the field device 1 at runtime of the field device 1. This EDS extension comprises one or more additional concrete objects which provide process values for the flow or the pH value, or other parameters etc. The EDS extension 3 is loaded on the field device 1 at runtime. Here, the EDS extension 3 is processed by a parser 4, and the database 5 is completed with the parsed objects.

A very simplified structure of an EDS file and of an EDS extension is shown below.

EDS-file (2)
[2000]
ParameterName=Buerkert Device Description Object
ObjectType=0x9
SubNumber=10
[2000sub0]
ParameterName=Number of entries
ObjectType=0x7
DataType=0x0005
AccessType=ro
DefaultValue=9
PDOMapping=0
LowLimit=9
HighLimit=9
[2000sub1]
ParameterName=Device Name
ObjectType=0x7
DataType=0x0009
AccessType=ro
DefaultValue=bueS-X-Gateway
PDOMapping=0
[2000sub2]
ParameterName=Ident Number
ObjectType=0x7
DataType=0x0007
AccessType=ro
PDOMapping=0
. . .
. . .
[2002]
ParameterName=User Configuration Object
ObjectType=0x9
SubNumber=4
[2002sub0]
ParameterName=Number of entries
ObjectType=0x7
DataType=0x0005
AccessType=ro
DefaultValue=3
PDOMapping=0
LowLimit=1
HighLimit=3
[2002sub1]
ParameterName=Unique Device Name
ObjectType=0x7
DataType=0x0009
AccessType=rw
PDOMapping=0
EDS-extension (3)
[2540]
ParameterName=actual flow 1
ObjectType=0x9
SubNumber=8
[2540sub0]
ParameterName=# of entries
ObjectType=0x7
DataType=0x0005

```
AccessType=ro
DefaultValue=7
PDOMapping=0
LowLimit=1
HighLimit=9
[2540sub1]
ParameterName=Value
ObjectType=0x7
DataType=8
AccessType=rww
PDOMapping=1
[2540sub2]
ParameterName=Unit
ObjectType=0x7
DataType=0x0007
AccessType=ro
DefaultValue=0x00A04700
PDOMapping=0
. . .
. . .
[2541]
ParameterName=actual flow 2
ObjectType=0x9
SubNumber=8
[2541sub0]
ParameterName=# of entries
ObjectType=0x7
DataType=0x0005
AccessType=ro
DefaultValue=7
PDOMapping=0
LowLimit=1
HighLimit=9
[2541sub1]
ParameterName=Value
ObjectType=0x7
DataType=8
AccessType=rww
PDOMapping=1
```

Whereas the EDS file 2 includes a complete device description, the EDS extension 3 merely contains concrete additional objects. These are added at runtime and are then available to the field device 1.

According to the standard, a concrete object can thus be defined by the following specifications: a parameter name (ParameterName; necessary); an object type (ObjectType (VAR); optional); a data type (DataType; necessary); an access Type (AccessType; necessary); a default value (DefaultValue; optional); the PDOMapping (optional); the SubNumber (optional); a lower limit (LowLimit; optional); an upper limit (HighLimit; optional); a flag (OjbFlags; optional), and the value CompactSubOjb (optional). From this follows that the minimum specification for a concrete object according to the standard is composed of the specification of a parameter name, a data type, and an access type.

Figure 2:
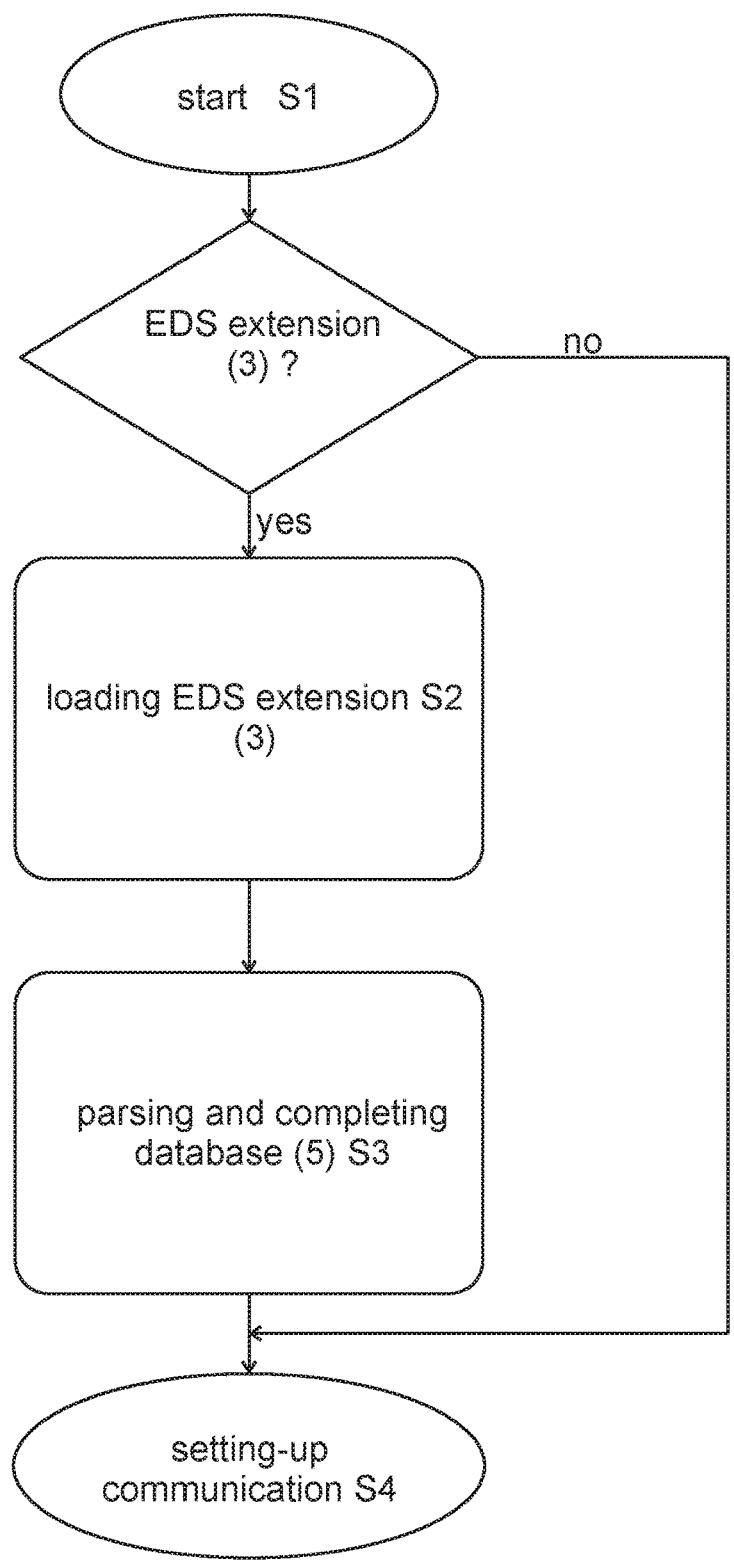
FIG. 2 is a simplified flow chart according to an example embodiment.

FIG. 2 is a simplified flow chart according to an example embodiment. In a first step S1, the field device 1 is put into operation with the EDS device description file. It is first checked whether an EDS extension 3 is present. In case an EDS extension 3 is present, the EDS extension 3 is loaded at runtime of the field device 1 in a further step S2. In a third step S3, the EDS extension 3 is parsed, and the database is completed with the additional objects. In a fourth step S4, the field device is then put into operation with the EDS file and the EDS extension or the communication is set up. This can also be performed after a restart or a reinitializing.

The present invention thus provides a method and a system for the function extension of a field device 1 such as a gateway or a controller. The extension is realized with objects which are available in the fieldbus system or in the network but initially were not yet known. An adaptation of the software of the field device is not necessary therefor. The field device can thus be extended at runtime by objects and process values which are described in a "configuration file". This "configuration file" may be an extension of a device description file. In CANopen, the device description file is an EDS file, and the "configuration file" corresponds to an EDS extension 3. The EDS file 2 is the static part which is already present on the field device 1. The EDS extension 3 is the dynamic part which can be loaded on the field device 1 at runtime. As soon as the EDS extension is present on the field device, all "new objects" are addressable and can be retrieved externally and be processed.

This permits the purposeful and efficient addition of concrete objects on field devices 1 at runtime without having to adapt the firmware. This permits the use of the invention in an initially unknown system. The field device is adapted to adjust the own object dictionary and the device description to the environment. Furthermore, the field device can flexibly represent other devices. Owing to the extension of the device description file EDS, the field device is in particular adapted to identify itself also with the new objects. The method is flexible and conserves resources as it is not necessary that the field device reserves storage area for possible objects. Furthermore, the field device is adapted to be smoothly integrated into the system, for example in that the objects are referenced in an appropriate manner and are described using appropriate data types and physical units.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method for the extension of a device description file of a field device comprising:
   loading a device description file on a field device,
   putting the field device with the device description file into operation in a fieldbus system, and
   loading an extension file on the field device during operation of the field device, the extension file including only concrete objects, and wherein the concrete objects each comprise at least one specified parameter name, one specified data type, and one specified access type, and wherein the device description file is managed in an object dictionary of the field device, and wherein, using the extension file, the object dictionary is dynamically extended by the concrete objects at runtime.

2. The method according to claim 1, wherein the device description file and the extension file use the same syntax.

3. The method according to claim 1, wherein the device description file is an EDS (Electronic Data Sheet) device description file for the CANopen standard, the extension file is an EDS extension for the CANopen standard, and the field device is configured for a fieldbus system according to the CANopen standard.

4. The method according to claim 1, comprising: parsing the extension file and using the concrete objects after a reinitializing or a restart of the field device.

5. The method according to claim 1, wherein the at least one field device is a gateway or controller.

6. The method according to claim 1, wherein the extension file is realized with the concrete objects which are available in the fieldbus system or in a network but initially are not yet known to the at least one field device, and wherein the system permits an addition of the concrete objects on the at least one field device at runtime without having to adapt firmware of the at least one field device.

7. The method according to claim 1, wherein the device description file comprises a static part which is already present on the at least one field device and the extension file comprises a dynamic part that is loaded on the at least one field device at runtime, and wherein as soon as the extension file is present on the at least one field device, all newly added concrete objects are addressable and can be retrieved externally and be processed.

8. The method according to claim 1, wherein the extension file dynamically extends the object dictionary of the at least one field device at runtime such that the concrete objects can then be used by functions of the at least one field device during operation of the at least one field device.

9. The method according to claim 8, wherein the at least one field device includes at least one sensor that is adapted to measure and evaluate at least one value, and wherein once the extension file is loaded on the field device, the field device can determine at least one additional value not previously capable of being determined by the field device prior to the extension file being loaded.

10. The method according to claim 9, wherein field device comprises a flowmeter and where the at least one sensor measures flow, and wherein the concrete object comprises pH value that is determinable once the extension file has been loaded on the field device.

11. The method according to claim 1, including extending the object dictionary via the extension file wherein the extension is performed such that the object dictionary is extended only by concrete objects.

12. A system comprising:
a fieldbus system having at least one field device; and
the system being configured to load a device description file on the field device, to put the field device with the device description file into operation in the fieldbus system, and to load an extension file on the field device during operation of the field device, and wherein the extension file only includes concrete objects, and wherein the concrete objects each comprise at least one specified parameter name, one specified data type, and one specified access type, and wherein the device description file is managed in an object dictionary of the field device, and wherein, using the extension file, the object dictionary is dynamically extended by the concrete objects at runtime.

13. The system according to claim 12, wherein the device description file is an EDS (Electronic Data Sheet) device description file for the CANopen standard, the extension file is an EDS extension for the CANopen standard, and the field device is configured for a fieldbus system according to the CANopen standard.

14. The system according to claim 12, wherein the at least one field device is a gateway or controller.

15. The system according to claim 12, wherein the extension file is realized with the concrete objects which are available in the fieldbus system or in a network but initially are not yet known to the at least one field device, and wherein the system permits an addition of the concrete objects on the at least one field device at runtime without having to adapt firmware of the at least one field device.

16. The system according to claim 12, wherein the device description file comprises a static part which is already present on the at least one field device and the extension file comprises a dynamic part that is loaded on the at least one field device at runtime, and wherein as soon as the extension file is present on the at least one field device, all newly added concrete objects are addressable and can be retrieved externally and be processed.

17. The system according to claim 12, wherein the extension file dynamically extends the object dictionary of the at least one field device at runtime such that the concrete objects can then be used by functions of the at least one field device during operation of the at least one field device.

18. The system according to claim 17, wherein the at least one field device includes at least one sensor that is adapted to measure and evaluate at least one value, and wherein once the extension file is loaded on the field device, the field device can determine at least one additional value not previously capable of being determined by the field device prior to the extension file being loaded.

19. The system according to claim 18, wherein field device comprises a flowmeter and where the at least one sensor measures flow, and wherein the concrete object comprises pH value that is determinable once the extension file has been loaded on the field device.

20. The system according to claim 12, wherein the object dictionary is extended via the extension file, and wherein the extension is performed such that the object dictionary is extended only by concrete objects.

* * * * *